United States Patent [19]

Bourgart et al.

[11] Patent Number: 5,272,694
[45] Date of Patent: Dec. 21, 1993

[54] SYNCHRONIZATION OF TERMINAL STATIONS IN A MULTIRATE HALF-DUPLEX TREE-STRUCTURED NETWORK

[75] Inventors: Fabrice Bourgart, Morlaix; Jacques Abiven, Plouaret, both of France

[73] Assignee: France Telecom, Paris, France

[21] Appl. No.: 854,899

[22] Filed: Mar. 20, 1992

[51] Int. Cl.$^5$ ............................................. H04B 3/20
[52] U.S. Cl. .................. 370/031; 370/105.4; 375/114
[58] Field of Search ................ 370/31, 100.1, 105.1, 370/105.2, 84, 110.1, 94.3, 32, 108, 103, 106, 105.4, 16; 340/825.02, 827; 375/116, 114, 107, 108, 109, 111, 113, 114

[56] References Cited

U.S. PATENT DOCUMENTS

| | | | |
|---|---|---|---|
| 5,014,272 | 5/1991 | Yoshida | 370/106 |
| 5,046,074 | 9/1991 | Abiven et al. | 370/105.1 |
| 5,177,739 | 1/1993 | Basnuevo et al. | 370/100.1 |

FOREIGN PATENT DOCUMENTS

| | | |
|---|---|---|
| 465300 | 6/1991 | European Pat. Off. |
| 2636482 | 3/1990 | France |

*Primary Examiner*—Douglas W. Olms
*Assistant Examiner*—Dang Ton
*Attorney, Agent, or Firm*—Laubscher & Laubscher

[57] ABSTRACT

The synchronization of a terminal station in a half-duplex tree-structured communication network consists in counting clock pulses in a central station. The pulses are counted between the emission of a forward frame including a synchronization word emission order that is intended for the terminal station, and the reception of the synchronization word emitted from the terminal station in response to the forward frame. As a function of the pulse count is computed a delay depending on the propagation time between the two stations so as to data sectors emitted by the terminal stations do not overlaps and form a backward frame whatever the different distances between the terminal stations and the central station. According to the invention, the counted pulses are pulses of a central clock signal phase-shifted to within a bit time fraction of the received words. The time intervals attributed to the sectors are thus determined more accurately. The central clock signal depends on the operating rate of the terminal station, and the network can then carry multirate frames. The invention also remedies to variations of propagation time between the stations caused by thermal drifts by modifying clock signals to regenerate sectors in the central station.

8 Claims, 9 Drawing Sheets

TCT

PT = 500 μs

SG(MSTF or MSTE) TTC

2 TP=109.375 μs
2 TPF=448bits

DT

DT=195.31μs (DTF=800bits at 4.096Mbit/s)

N = 8 channel sectors

SG — S1 S2 S3 S4 S5 S6 S7 S8

DS=23.44μs

DS=23.44μs
DF=4.096Mbit/s
NBF=96bits dF=160kbit/s
nbF=80bits

DS=23.44μs
DE=49.152=12x4.096Mbit/s
NBE=1152=96x12bits dE=2.048Mbit/s
nbE=1024 bits

SG

DG=DS/3=7.81μs
DF=4.096Mbit/s
NBG=32bits dG=64kbit/s
nbG=32 bits

| MVT | J | OC | IC | AG |
|---|---|---|---|---|

SG

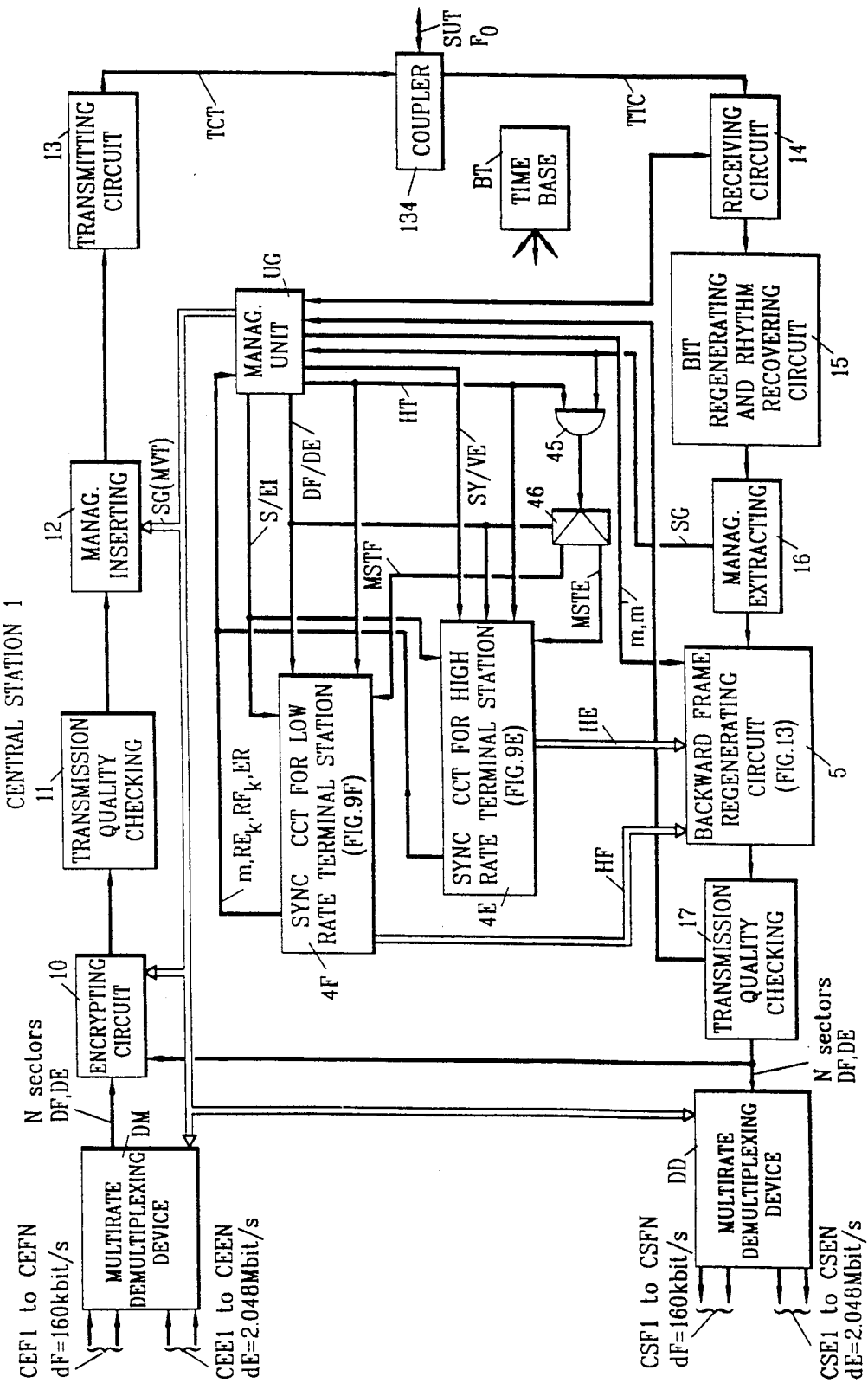

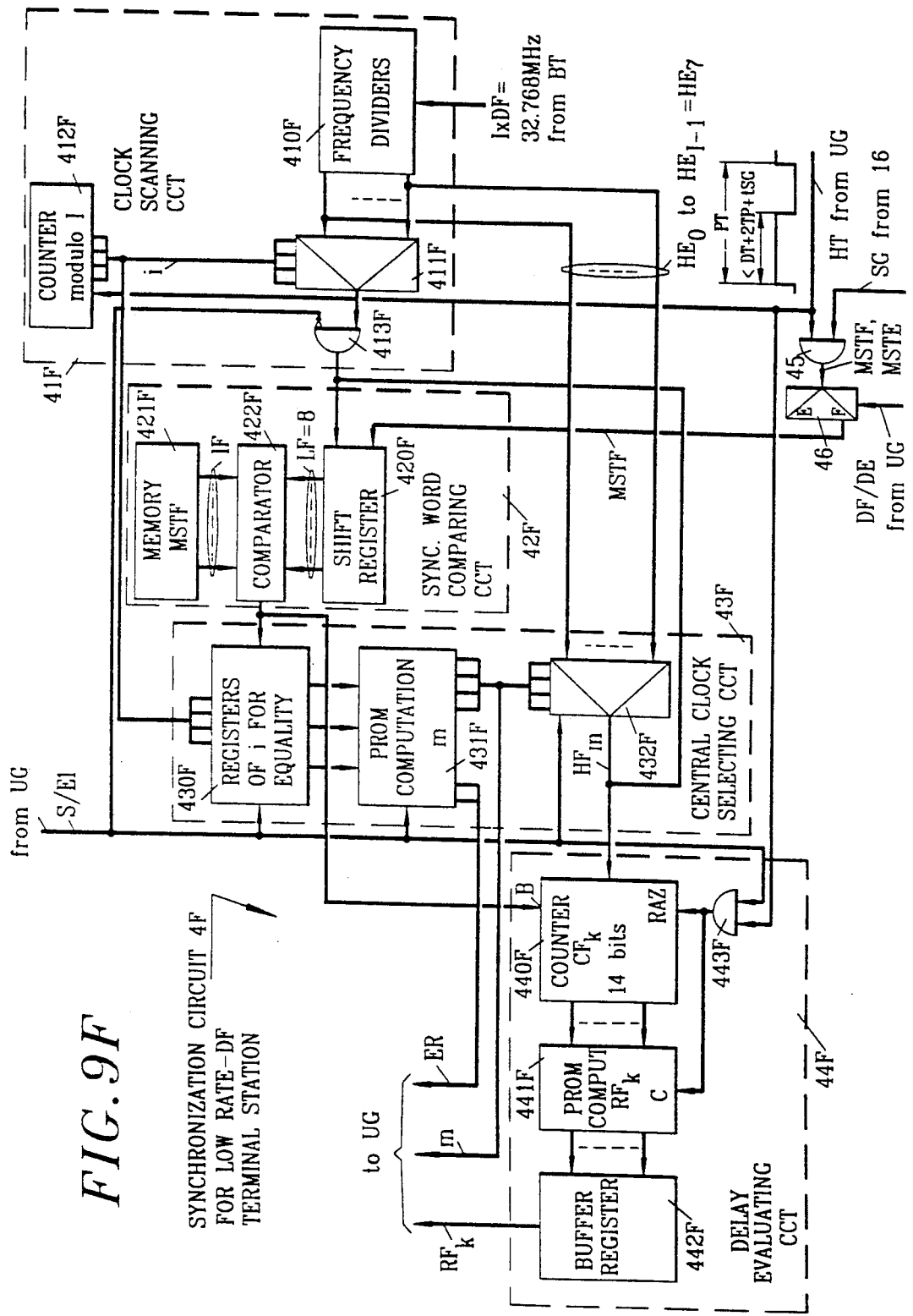

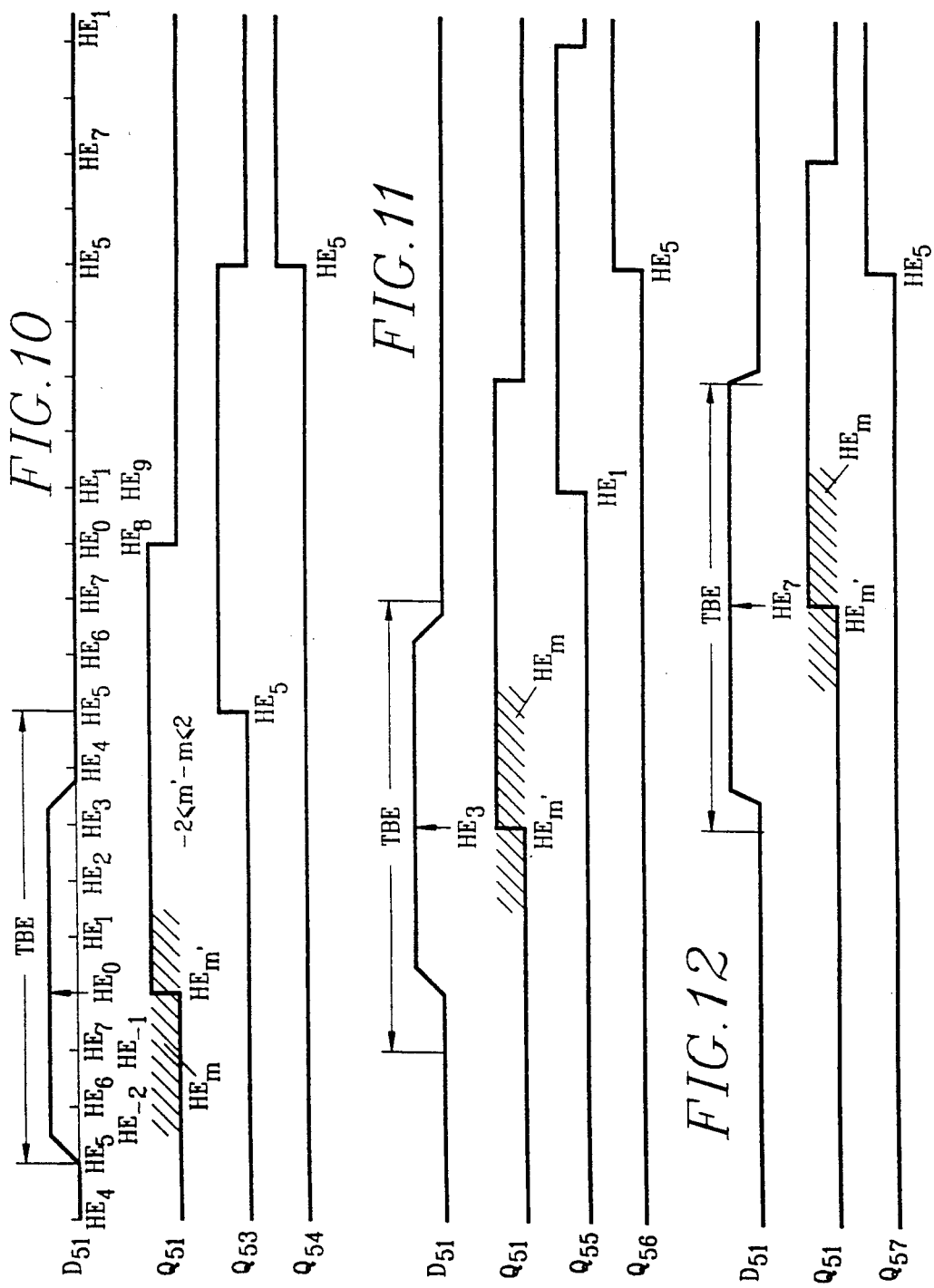

SYNCHRONIZATION OF TERMINAL STATIONS IN A MULTIRATE HALF-DUPLEX TREE-STRUCTURED NETWORK

BACKGROUND OF THE INVENTION

1 - Field of the Invention

This invention relates to the synchronization of terminal stations linked to a central station via a tree-structured digital communication network. The terminal stations are at different distances from the main station. Synchronization is obtained chiefly in the central station so that data sectors or packets emitted respectively by terminal stations in communication with the central station do not overlap in time and through time multiplexing form a backward frame on receiving in the central station.

2 - Description of the Prior Art

To accomplish this synchronization the central station evaluates the propagation time through the network between the central station and each of the terminal stations, and from this deduces a delay which is transmitted to and programmable in the terminal station so that a data sector emitted by the terminal station inserts into a predetermined assigned time interval of the backward frame.

The French patent application No. 2,636,482 divulges such a synchronization method for a single-rate collective half-duplex communication network. The synchronization method relating to a terminal station according to this patent application comprises:

emitting from the central station a forward frame including a synchronization word emission order intended for the terminal station to be synchronized and having a predetermined rate, triggering a periodical pulse counting in the central station when emitting the forward frame, transmitting a synchronization word by the terminal station to the central station in response to the reception end of the forward frame, halting the pulse counting in response to the detection of the synchronization word in the central station so as to derive a pulse count, computing a delay as a function of the pulse count, and transmitting the delay from the central station to the terminal station so that the terminal station transmits a data sector in an assigned time interval of the backward frame.

According to this method, the periodical pulses are those of a clock signal at the binary rate of the digital frames exchanged by the stations, and especially at the single operating rate of the terminal stations.

Nevertheless, the working of this network shows that the synchronization of the terminal stations in relation to a single clock signal at the rate of the terminal stations confers risks of data sectors overlapping in the backward frame. In fact, the propagation times between stations and hence the programmable delays are assessed to the nearest bit times. These assessments are all the less accurate when the stations have a high rate, and when the bit time is similar to the response times of the present day electronic components and/or variations in propagation time due to thermal drifts in the transmission network.

OBJECT OF THE INVENTION

The main object of the invention is to synchronize the terminal stations more accurately, whatever the low or high rate of the terminal stations, and whatever the differences in rates between terminal stations.

SUMMARY OF THE INVENTION

Accordingly, there is provided a method for synchronizing terminal stations located at different distances from a central station and linked through a tree-structured transmission medium so that data sectors emitted by the terminal stations at different times do not overlap and are multiplexed in a backward frame on receiving in the central station, the method previously comprising in the central station, determining a central clock signal as a function of synchronization words successively transmitted by one of the terminal stations to be synchronized and detected by the central station, the terminal station being associated with a predetermined rate, and the central clock signal being determined to the nearest fraction TB/I of bit time TB of the synchronization words transmitted at the predetermined rate, where I denotes an integer, the determination of the central clock signal comprising I sub-steps, a sub-step of index i varying from 0 to I-1 comprising:

emitting from the central station a forward frame including a synchronization word emission order intended for the terminal station, transmitting the synchronization word from the terminal station in response to the reception end of the forward frame, detecting the transmitted synchronization word in the central station by means of a clock signal having a phase-shift i.TB/I in relation to a reference clock signal and having the rate of the terminal station, and comparing the detected synchronization word with a synchronization word stored in the central station, and storing the index i in response to an equality of the compared words, and the method comprising subsequently to the I sub-steps, computing index m as a function of substantially the center of the indices of the clock signals having caused equalities of words, thereby determining the central clock signal, emitting from the central station at least one last forward frame including the synchronization word emission order intended for the terminal station to be synchronized, triggering a counting of pulses of the central clock signal in the central station responsive to emitting the last forward frame, transmitting a last synchronization word from the terminal station to the central station in response to the reception end of the forward frame, halting the pulse counting in response to the detection of the last synchronization word in the central station as a function of the central clock signal so as to derive a pulse count, computing a delay as a function of the pulse count, and transmitting the delay from the central station to the terminal station so that the terminal station emits a data sector in an assigned time interval of subsequent backward frames.

According to preferred embodiments, the integer I is greater than two, and typically equal to eight.

As opposed to the prior art, the synchronization of a terminal station is no longer performed to the nearest bit time, but to a fraction of bit time, and hence as a function of the operating rate of the terminal stations. The pulse count is thus more representative of the propagation time between the central station and the terminal station on the one hand, and depends on the central clock signal and hence the rate of the terminal station, on the other hand. This latter feature authorizes the working of synchronization for terminal stations operating with different rates, and the use of central clock signals to regenerate precisely the backward frame sectors respectively.

Generally speaking the regeneration of a data sector emitted by a terminal station includes the receiving of this sector in the central station in relation to a respective central clock signal so as to produce a sector received, and the regeneration of the received sector in relation to a predetermined reference clock signal which is used to regenerate all the data sectors in a backward frame emitted by the terminal stations.

Especially, when the rate of a terminal station is high, typically greater than some ten Mbit/s, and the propagation times are subject to thermal drifts which may generate variations in the order of the bit time between two synchronizations, the method comprises at least a cyclic check on the synchronization of the terminal stations. The check consists in determining a second central clock signal, evaluating a shift between a first central clock signal determined during a previous check and the second central clock signal, in receiving in the central station any data sector by the terminal station in relation to the second central clock signal, and in regenerating the bits of the received data sector as a function of the evaluated shift and in relation to a predetermined reference clock signal which is used to regenerate all the data sectors in a backward frame emitted by the terminal stations.

The invention also concerns a synchronization device for synchronizing one of terminal stations located at different distances from a central station and linked through a tree-structured transmission medium so that data sectors emitted by the terminal stations at different times do not overlap and are multiplexed in a backward frame on receiving in the central station. This device is included in the central station and comprises:

means for producing at least I clock signals at the predetermined rate of the terminal station and phase-shifted by TB/I respectively during I successive frame periods where TB is the bit time of bits emitted at the predetermined rate from the terminal station and I is an integer, means for detecting synchronization words transmitted by the terminal station in relation to the I clock signals during the I frame periods thereby deriving I detected synchronization words, respectively, means for comparing the I detected synchronization words with a reference synchronization word stored in the central station, means for storing the indices of the clock signals having caused an equality between the respective detected synchronization word and the reference synchronization word in the comparing means, means for computing an index as a function substantially of the center of the indices of the clock signals having caused equalities of compared words thereby producing a central clock signal corresponding to the computed index and designed to regenerate bits transmitted by the terminal station after the synchronization thereof, means for counting pulses of the central clock signal between emission of a forward frame by the central station and detection of a synchronization word in relation to the central clock signal during a frame period succeeding the I frame periods thereby deriving a pulse count, and means for computing the delay as a function of the pulse count whereby the central station transmits the delay to the terminal station, and the terminal station transmits a data sector in an assigned time interval of subsequent backward frames.

The synchronization device also includes means for receiving all data sector bits transmitted by the terminal stations at the predetermined rate of the central clock signal, and means for regenerating each bit received by the central station in relation to the same reference clock signal whatever the terminal station.

BRIEF DESCRIPTION OF THE DRAWINGS

Further advantages of the invention will be more clearly apparent from the following particular description of preferred embodiments of the method and device embodying the invention as illustrated in the corresponding accompanying drawings in which:

FIG. 2 shows a forward frame and a backward frame in a half-duplex frame period;

FIG. 3 shows the structure of a forward frame similar to that of a backward frame;

FIG. 4 shows a management sector in a forward frame;

FIG. 8 is schematic block diagram of a central station embodying the invention;

FIGS. 9F and 9E are detailed block diagrams of synchronization circuits included in the central station for terminal stations with high rate and low rate, respectively;

FIGS. 10, 11 and 12 are time diagrams of bits received in the central station and of clock signals regenerating received bits at high rate, respectively for three sets of central clock signals selected as a function of the index of a central clock signal established when checking the synchronization of a terminal station.

DESCRIPTION OF THE PREFERRED EMBODIMENTS

Figure 1:
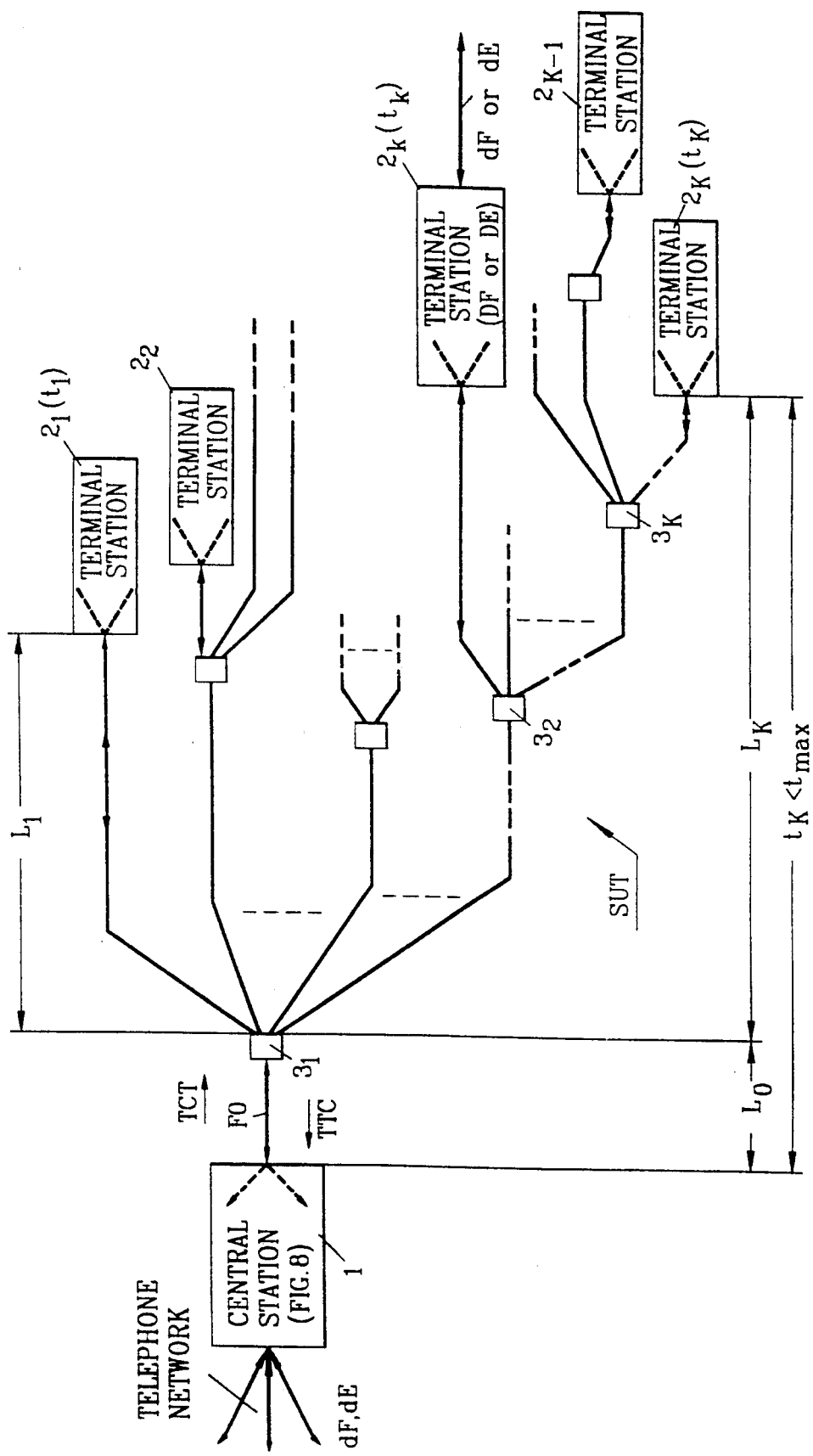
FIG. 1 shows schematically the known architecture of a multirate half-duplex tree-structured communication network for implementing the synchronization method embodying the invention.

The detailed description below refers, as preferred embodiment, to a multirate half-duplex communication network having a tree-structure transmission medium SUT, for example optical fiber, as shown in FIG. 1. Half-duplex transmission in the network is in so-called collective half-duplex mode with a time-division multiple access (TDMA). The network comprises a central station 1 and a number K of users' terminal stations $2_1$ to $2_K$.

The integer K is chosen as a function of the number N of digital channel sectors in a multirate frame and the number of different rates corresponding to the terminal stations, as will be seen later.

So as to clarify the ideas, the numerical values of parameters, such as numbers of sectors, times, bit rates, frequencies and numbers of bits, notably relating to a multirate frame, are indicated below. Thus the number of sectors N is chosen as equal to 8, and the different rates are in number equal to 2 and designated by a low on-line rate DF=4.096 Mbit/s and a high on-line rate DE=49.152 Mbit/s.

The central station acts as a telephone automatic switching center servicing several tree-structured networks such as the one shown in FIG. 1. The central station is connected to N bidirectional digital channels having a low primary rate of dF=160 kbit/s which is lower than the low on-line rate DF, and to bidirectional digital channels having a high primary rate of dE=2.048 Mbit/s which is lower than the high on-line rate DE. The 2N bidirectional channels are linked to the general telephone switched network. Depending on the requests for incoming or outgoing calls emanating from the general telephone switched network or terminal stations, the central station attributes frame sectors to the communicating terminal stations. The central station multiplexes, with respective increases in rate, the channels into forward frame sectors, and demultiplexes, with respective reductions in rate, backward frame sectors into digital channels. The special multiplexing and demultiplexing operations do not come within the scope of the invention. Reference can be made in this connection to the U.S. patent application Ser. No. 07/786,763 filed on Nov. 1, 1991 by ABIVEN Jacques, entitled "Multirate digital multiplexing-demultiplexing method and device" and assigned to the assignee of the present application.

The invention deals particularly with the frame management and synchronization functions carried out chiefly in the central station on the side of the tree-structured medium SUT, downline from the multirate multiplexing means according to the forward direction of frames TCT emitted by the central station, and upline from the multirate demultiplexing means according to the backward direction of frames TTC received by the central station. The forward and backward directions are also referred to as "descending" and "ascending" directions.

Each terminal station is compatible with a predetermined on-line rate DF or DE, so as to be of service to a telephone installation, such as a local network, at the lower corresponding rate dF or dE.

The communication network linking central station 1 to terminal stations $2_1$ and $2_K$ consist of a tree whose trunk starts from the central station and whose branches spread out on the bi-directional optical couplers 3 having a common access directed toward the central station and several secondary accesses directed toward the terminal stations.

As shown schematically in FIG. 1, the terminal stations $2_1$ to $2_K$ are located at different distances with respect to the central station. In this Figure, a first coupler $3_1$ is located at a distance $L_O$ from the central station 1 along an optical fiber FO of tree trunk, and is linked via respective secondary accesses, notably to a first terminal station $2_1$ by a length of optical fiber $L_1$, and to a terminal station $2_K$ by a length of optical fiber $L_K$ through at least two couplers $3_2$ to $3_K$. The other accesses of the couplers $3_2$ to $3_K$ service other terminal stations, in this case terminal stations $2_k$ to $2_{K-1}$, where k is integer lying between 1 and K. Thus terminal station $2_1$ is linked to the central station by a length of optical fiber $L_O+L_1$ and a single coupler $3_1$, whereas terminal station $2_K$ is linked to the central station through a length of optical fiber $L_O+L_K$ through at least three couplers $3_1$, $3_2$, and $3_K$. This disparity in the distances between central station and terminal stations introduces into the exchanged signals, not only different propagation delay times but also different signal attenuations.

The means of remedying the disparity in the signal attenuations do not come within the scope of this invention, and the reader should refer in this connection to the European patent application No. 465,300 filed on Jun. 26, 1991, published on Jan. 8, 1992 and entitled "Terminals emitting level setting method in a half-duplex transmission network".

If $t_k$ designates the propagation delay time between central station 1 and any terminal station $2_k$ where k is an integer lying between 1 and K, and if the distance $L_O+L_k$ between these stations is between 0 and 10 km approximately, the propagation delay times $t_1$ to $t_K$ relating to stations $2_1$ to $2_K$ are less than 33 μs, i.e., less than a maximum approximate delay time of $T_{max}=50$ μs. As indicated in French patent application No 2,636,482, the different sectors of a TTC backward frame should be transmitted by the terminal stations in communication with the central station at precise times to avoid any overlapping of sectors when progressively constituting the frame TTC on couplers $3_1$ to $3_K$, and especially on receiving in central station 1. Said precise times depend directly on the different propagation delay times respectively and are marked in relation to a reference time imposed by the central station which acts as master station versus the slave terminal stations. The reference time corresponds to the transmission start of the forward frame TCT from the central station and the start of a frame period PT of the half-duplex transmission.

Referring to FIG. 2, the half-duplex transmission frequency is 2 kHz, i.e., corresponds to a half-duplex frame period PT=500 μs. Each frame TCT, TTC has a duration less than the half-period of frame PT/2=250 μs to take account of the maximum forward/backward propagation time $2t_{max}$ between central station 1 and the most remote terminal station, i.e., a time $2TP>2t_{max}$ between the transmission end of the frame TCT and the reception start of the frame TTC in the central station. The time 2TP also includes a very short standby time necessary to the switching from transmitting mode to receiving mode in each of the central and terminal stations. For example, if it is considered that information is transmitted at low on-line rate DF=4.096 Mbit/s, i.e., a bit time equal to 0.244 μs, a frame TCT, TTC contains 800 bits and lasts DT=195.31 μs which confers a maximum time 2TP=109.375 μs, corresponding to 2TPF=448 bits at 4.096 Mbit/s. The time 2TP is more than necessary to exchange signals between the central station and any terminal station some 10 kilometers away from the central station, through a few couplers.

As shown in detail in FIG. 3, especially for the forward frame TCT, a frame consists of a management sector SG in the heading of the frame and of N=8 digital data channel sectors S1 to S8 reserved to the users' terminal stations in communication with the central station.

The management sector SG is used to manage relations between the central station and terminal stations and notably relevant to a given terminal station, to the setting into service of the terminal station, to the authorization of data transmission, to requests to transmit an amplitude reference word (MRA) and a time synchronization word (MST) ordered by the central station, to the attribution of one of the data channel sectors, to the identification of the on-line rate of the sector, to the request for status information on the terminal station, etc... As detailed in FIG. 4, the management sector SG in the forward frame TCT consists of a frame alignment word MVT, a terminal station address, referred to as token J, a command order field OC, a command information field IC, and other management bits not coming within the scope of this invention and designated by AG and relating notably to station maintenance.

The frame alignment word MVT typically has 8 bits and is conventionally designed to synchronize time bases included in the user terminal stations $2_1$ to $2_K$, acting as slave stations, with a time base clock included in the central station 1, acting as master station. The start of emitting a word MVT in the forward frame TCT defines the start of a frame period PT. Notably responsive to the frame alignment word being detected, each terminal station recovers the respective bit clock, here equal to $H_{DF}=4.096$ MHz or $H_{DE}=49.152$ MHz, and from this deduces the necessary higher clocks, notably 49.152 MHz for a terminal station compatible with rate DF.

The token J consists of the number 1 to K of the terminal stations $2_1$ to $2_K$ for which is intended the information OC and IC following in the management sector. When K=8, token J consists of a 3-bit word. To avoid any errors, i.e., notably to avoid an already synchronized terminal station answering the central station owing to an error in the transmission of the token, a user terminal station must detect its number as token in two successive forward frames TCT so as to deduce the OC and IC information, especially for a word MST transmission, are designed for it.

Field OC consists of various encoded command orders according to an exchange protocol between the central station and the terminal station. These orders can concern the setting into service of a terminal station, i.e., firstly the attribution to this terminal station of an available channel sector S1 to S8, and secondly a procedure designed for the progressive setting of the amplitude level of the transmitter in the terminal station via an amplitude reference word MRA at the rate of DF=4.096 Mbit/s as described in the aforesaid European patent application No. 465,300, and an order to emit a time synchronization word MST to trigger a synchronization procedure as embodied by the invention. The command order can also concern all requests for incoming or outgoing communication between the central station and each terminal station.

Field IC contains values associated to the command orders included in field OC, for example, a numerical value associated to a summation ordered by an encoded word included in field OC. This additional management information serves numerous functions and is all expressed in digital form. In particular field IC can contain an amplitude setting word (UD) for a terminal station according to European patent application No. 465,300.

The bits of the management sector SG are processed in the stations at primary rate dG=64 kbit/s and are therefore in number of nbg=64×0.5=32 for PT=500 μs. By imposing a on-line rate DG in sector SG equal to the lower rate DF=4.096 Mbit/s in the data sectors so that the management sector can be interpreted by all the terminal stations, the duration of the management sector is DG=7.81 μs, i.e., a third of the period DS=23.44 μs of each of the data sectors S1 to S8.

A data sector Sn with a given rank n lying between 1 and N =8 is not assigned once and for all to a terminal station, but is dedicated to a terminal station by central station 1 as a function of the availabilities of the other sectors. For example, on a request for communication, sector S2 of rank 2 can be assigned to terminal stations $20_{k-1}$ of rank k-1. Each data sector is designed to carry the actual information between the terminal station and another remote terminal station via central station 1 and if required the general telephone switched network.

According to the embodiment considered here, the digital channels have one of the two primary bit rates dF=160 kbit/s and dE=2.048 Mbit/s. Nevertheless, according to other embodiments, the number of different primary rates and thus the number of the on-line rates in the sectors, can be higher, or even equal to the number N=8 of sectors. The on-line rates are, for example, sub-multiples of the highest on-line rate DE and can be 4.096 Mbit/s; 8.192 Mbit/s; 12.288 Mbit/s; 16.384 Mbit/s and 24.576 Mbit/s.

The digital channels at the rates dF and dE are thus divided into groups of nbF=160×0.5=80 bits and nbE=2058×0.5=1.024 bits at each frame period PT. In the multirate multiplexing means of the central station, or in the transmission means of a terminal station, a group of bits at low primary rate dF is packed into a sector, such as sector S2 in FIG. 1, in order to be transmitted at low on-line rate DF=4.096 Mbit/s; this sector then comprises NBF=(DF.DS)=96 bits which include nbF=80 channel useful data bits. In a similar way, a group of bits at high primary rate dE is packed into a sector, such as sector S8 in FIG. 1, in order to be transmitted at high on-line rate DE=49.152 Mbit/s; this sector comprises NBE=(DE.DS)=1152 bits which include nbE=1024 channel useful data bits. The additional bits in the sectors, respectively in numbers NBF-nbF=16 and NBE-nbE=128, are filling bits of no significance whatsoever, or are preferably used partially for maintenance purposes, and located at the end of the sectors.

It should be noted that the on-line rates which are determined as a function of the operating features of various types of terminal stations, are preferably multiples of the low on-line rate DF, and more precisely the on-line rate DG of the management sector, in order to enable processing of the management sector by all the terminal stations. In this example, a bit at low rate DF is equivalent to DE/DF=12 successive bits in the same logic state and at the rate DE, i.e., the width of a bit at the low rate DF is 12 times greater than the width of a bit at the high rate DE in the frame.

In the backward direction, terminal stations $2_1$ to $2_K$ toward central station 1, the backward frame TTC has a structure similar to the forward frame TCT, and comprises a management field SG and N channel sectors attributed to the communicating terminal stations. As shown in FIG. 2, sectors S1 to S8 are consecutive in frame TTC, as in frame TCT. The reception end of the last sector S8 of frame TTC in a central station defines the end of a frame period PT. For the same communication relative to a terminal station, the two data channel sectors attributed to it have the same rank in frames TCT and TTC.

Nevertheless, although management field SG in the backward frame TTC has a structure similar to that of forward frame TCT, field SG in backward frame TTC is only consecutive to the first sector S1 at the end of the time synchronization procedure as embodied by the invention. During this procedure, field SG has a time location comprised in the propagation time $2t_k$ which depends on the distance between terminal station $2_k$ in method of synchronization and central station 1. It must be recalled that the fields SG in the frames TTC and TCT only carry information relative to one terminal station at a time.

During the time synchronization of a terminal station $2_k$, sector SG in backward frame TTC starts by a time synchronization word MSTF, MSTE which is preferably one or several repetitions of the frame alignment word MVT emitted by the central station. The word MVT typically has 8 bits. The word MSTF, MSTE forms time information that precisely enables the central station to deduce the propagation time $t_k$ and hence the distance between the stations, by comparing the bits of word MSTE, MSTF, with the bits of the same word prestored in the central station. Likewise during the setting of transmitting amplitude in the transmitter of terminal stations $2_k$ according to the European patent application No. 465,300, which can be quasi-simultaneous to the time synchronization, field IC of sector SG in frame TTC is composed of the amplitude reference word (MRA) consisting of 8 successive bits at state "1" whose amplitude depends on the programmable transmitting level in the transmitter. Nevertheless, if all the words in sector SG in forward frame TCT and all the words in sector SG in backward frame TTC, with the exception of the word MSTF, MSTE, are at constant low rate $DF = 4.096$ Mbit/s, the word MSTF, MSTE is at respective transmission rate DF, DE of the terminal station in process of synchronization. Thus the synchronization word field MSTF, MSTE in sector SG of frame TTC has a duration equal to $8/4.096 = 1.95$ μs. The synchronization field is totally occupied by a word MSTF having 8 bits for a terminal station at low rate $DF = 4.096$ Mbit/s, and is occupied at the start of the field, by a word MSTE also having 96 bits for a terminal station at high rate $DE = 49.152$ Mbit/s. Nevertheless, according to other embodiments, MSTE can comprise $8(DE/DS) = 96$ bits maximum. The words MSTF and MSTE also contribute to precisely evaluating the propagation times $t_1$ to $t_k$ as a function of the rates associated to the terminal stations so as to determine the transmitting times of the various sectors in the terminal stations after the respective synchronization procedures of the terminal stations.

Moreover it will be noted that the absence of confusion as to the origin of the synchronization word MSTF, MSTE and more generally sector SG of frame TTC, results from the transmission of word MSTF, MSTE as soon as the end of receiving forward frame TCT by the terminal station in process of synchronization.

Figure 5:
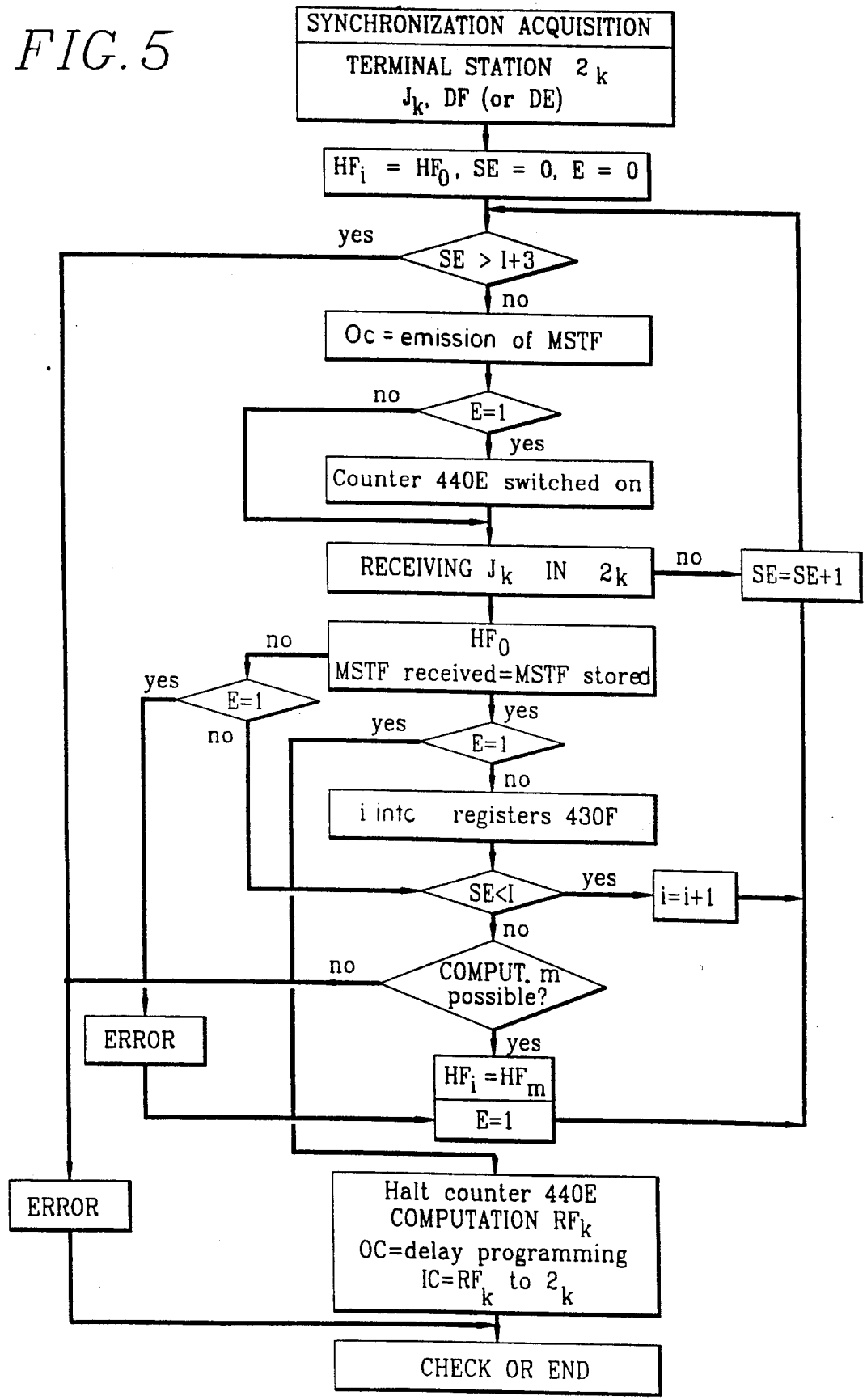
FIG. 5 is an algorithm of steps and sub-steps of the synchronization of a terminal station as embodied by the invention.
Figure 6:
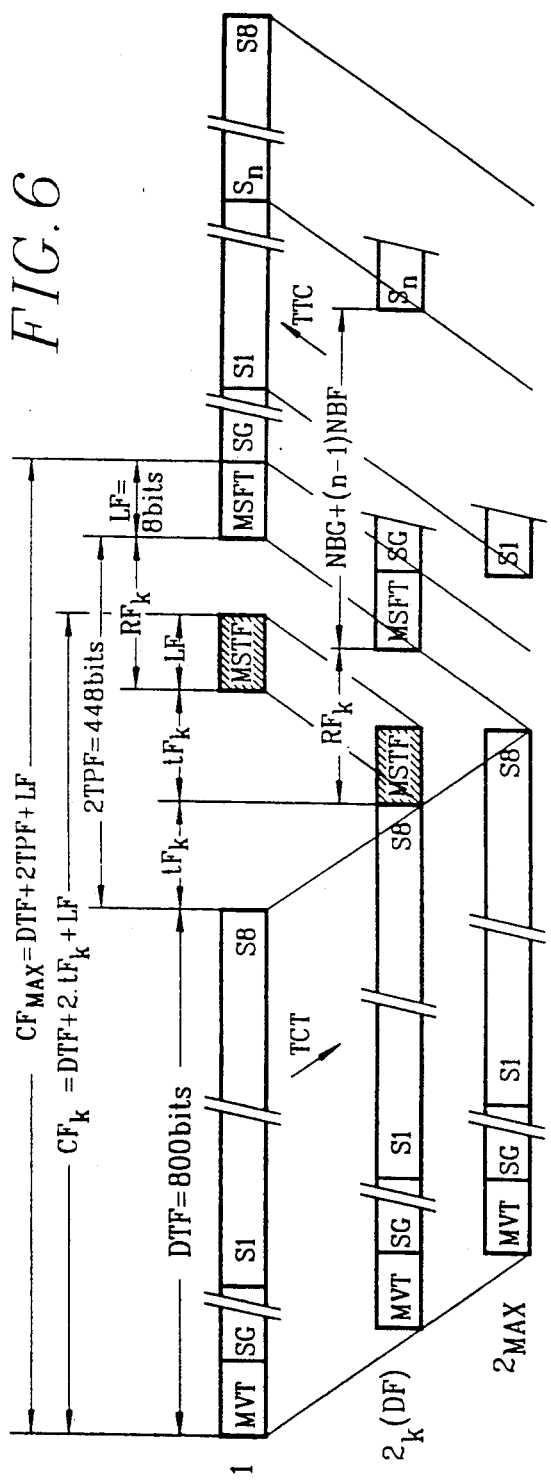
FIG. 6 is a chronogram relating to the transmission of forward frames and synchronization words for the synchronization of a terminal station, the times being expressed in numbers of bits at a low rate.
Figure 7:
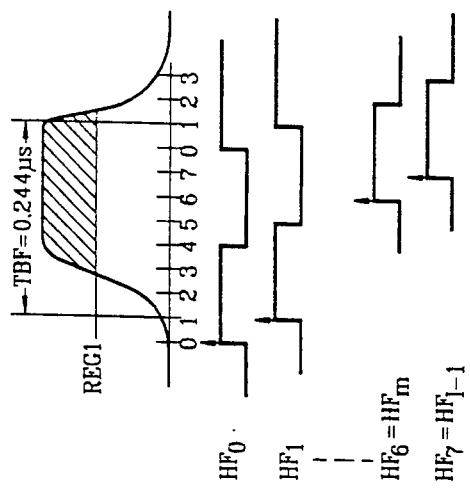
FIG. 7 is a time diagram relating to a bit received in a central station and to clock signals.

Referring to FIGS. 5 to 7, the synchronization acquiring method relating to any terminal station $2_k$ essentially comprises a first step consisting in a precise determination of the clock phase of a signal transmitted by station $2_k$ and received in central station 1, then a second step consisting in computing a delay depending on the clock phase determined in central station 1. This delay is programmed by the central station in terminal station $2_k$ so that any data sectors emitted by station $2_k$ arise during the time interval corresponding to the backward frame TTC in the central station. These two steps are indicated respectively by $E=0$ and $E=1$ in the synchronization acquisition algorithm shown in FIG. 5 and including together $1 + I + 1$ sub-steps of loop SE, the last sub-step consisting of step $E=1$.

It will be from now on assumed that terminal station $2_k$ operates at low rate $DF = 4.096$ Mbit/s.

As already stated, a terminal station only considers command orders OC in a forward frame TCT which is designed for it only after detecting its token $J_k$ in two successive frames TCT. Consequently prior to said clock phase determination, central station 1 emits at the start of two sub-steps $SE = 0$ and $SE = 1$, two forward frames TCT which notably comprise the frame alignment word MVT, token $J_k$ and a synchronization command order in field OC. In response to the second detection of token $J_k$ in terminal station $2_k$, station $2_k$ transmits the time synchronization word MSTF at respective rate DF immediately after the end of receiving the second forward frame TCT, i.e., after the end of receiving sector S8 of this frame. The word MSTF emitted at this step is represented in the form of the hachured rectangle in FIG. 6. The word MSTF is received in central station 1 after a time $DT + 2t_k$ succeeding to the start of word MVT in second frame TCT. Knowing that the time base in terminal station $2_k$ recovers the clock at low rate of $DF = 4.096$ Mbit/s, the time $DT + 2t_k$ is determined to within bit time $TBF = 0.244$ μs.

The clock phase determination consists in detecting word MSTF in the central station in relation to I predetermined clock signals $HF_0$ to $HF_{I-1}$ at rate DF of terminal station $2_k$ which are successively phase shifted two-by-two by $TBF/I$. Typically as shown in FIG. 7, integer I is equal to eight. Thus at the end of second sub-step $SE = 1$, the word MSTF received in the central station is detected in relation to the rising edges of the pulses of a first clock signal $HF_0$ which corresponds e.g. to the master clock signal used to emit the management sector of forward frame TCT, and is compared to word MSTF stored in read-only-memory in the central station. The other following sub-steps $SE = 2$ to $SE = I$ consists, as in step $SE = 1$, each in emitting a frame TCT including token $J_k$ by the central station, in emitting the word MSTF by terminal station $2_k$ as soon as the end of receiving frame TCT, in detecting the word MSTF in relation to the respective clock signal $HF_1$ to $HF_{I-1}$, and in comparing the word detected with the stored word MSTF in the central station.

FIG. 7 shows, in a continuous line, a bit to logic state "1" in the word MSTF received in central station 1. As known, the bit especially has fore rising and rear falling edges deformed owing to processings thereof between the terminal and central stations and attenuation constraints in the transmission medium SUT. According to the example shown in FIG. 7, only clock signals $HF_3$ to $HF_7$ and $HF_0$ to $HF_1$ authorize detection of the bit "1" above a predetermined regeneration threshold REG1, and consequently a bit equality in the received and stored compared words MSTF. The same applies to a bit to logical state "0" in the word received MSTF, having an amplitude less than a predetermined regeneration threshold REG0 which is less than or equal to REG1. As indicated in FIG. 5, at the end of each substep SE=i+1, where index i is an integer lying between 0 and I-1, the number i of clock signal $HF_i$ phase shifted by i.TBF/I in relation to signal $HF_0$ is stored if there is identity between compared words. At the end of substep SE=I, the central station selects a central clock signal $HF_m$, here equal to $HF_6$ according to FIG. 7, which is substantially in the "center" in the series of clock signals adopted $HF_3$ to $HF_7$, $HF_0$ to $HF_1$. When the series includes an even number of signals, index m is for example the one immediately below the "center" or average of the series.

The central station then performs the last sub-step SE=I+1 consisting in a delay computation step E=1. The central clock signal $HF_m$ acts as reference clock signal not only for the computation of the programmable delay, but also to regenerate in central station 1, the data sector attributed ultimately to terminal station $2_k$, which expresses a minimum binary error rate.

The delay computation step E=1 consists in computing the delay to be imposed $RF_k$ in terminal station $2_k$ so that a time synchronization word MSTF emitted by this station arrives in the central station 1 exactly at the start of the backward frame TTC constituted by communicating terminal stations. This delay $RF_k$ together with the other propagation times and periods in FIG. 6 are expressed in corresponding numbers of bits at rate DF of station $2_k$, and are evaluated by a binary counter 440F included in the central station.

At the start of step E=1, counter 440F is reset before emitting frame TTC. The counter is then switched on and rhythmed by central clock signal $HF_m$ as soon as the start of emitting word MVT in forward frame TTC. The pulse count of signal $HF_m$ in counter 440F is halted as soon as word MSTF, indicated in the form of a hachured rectangle in FIG. 6, emitted by station $2_k$ and detected by means of signal $HF_m$ is received. The count of the counter is then $CF_k = DTF + 2F_k + LF$, where DTF=800 denotes the number of bits at rate DF likely to be contained in a frame TTC lasting DT, $tF_k$ denotes the propagation time $t_k$ between station 1 and $2_k$ as a function of a number of bits at the low rate, and LF=8 denotes the number of bits in word MSTF. When station $2_k$ is a terminal station $2_{MAX}$ most remote from the central station, as shown in a third line of FIG. 6, the delay to be imposed $RF_{MAX}$ is nil, whereas the corresponding count of counter 440F is maximum and is as follows:

$$CF_{MAX} = DTF + 2.TPF + LF.$$

where 2.TPF expresses in number of bits, the maximum forward/backward propagation time between the end of the forward frame TCT and the start of the backward frame TTC in the central station.

The delay $RF_k$, also expressed in number of bits, to be imposed in the terminal station $2_k$ is deduced from FIG. 6:

$$RF_k = CF_{MAX} - CF_k.$$

and is thus obtained by simply subtracting a measured value $CF_k$ from a known fixed value $CF_{MAX}$. Naturally the delay $RF_k$ repreemitteds the difference between the propagation times: $TP-t_k$.

After evaluating the delay $RF_k$ in the central station, or preferably after two successive and identical evaluations of delay $RF_k$, during two steps E=1, central station 1 transmits an order inserted in field OC for programming a delay means, accompanied by digital value $RF_k$ in the field IC of a forthcoming forward frame TTC, or preferably two successive backward frames TTC. The delay means is included in terminal station $2_k$ and programmed as a function of $RF_k$ as soon as the management sector of the previous forward frame is received. The result is that the next management sector of frame TTC is emitted by station $2_k$ after a delay $RF_k$ succeeding to the end of the frame TTC. Terminal station $2_k$ is then synchronized. In particular the subsequent emitting of a channel sector Sn in backward frame TTC by station $2_k$, in response to an attribution order by the central station, starts exactly after a delay of $RF_k + NBG + (n-1)NBF$ succeeding to the end of receiving a forward frame TCT.

The synchronization method described above is applicable whatever the operating rate of a terminal station. For example, for a terminal station operating at rate DE=49.152 Mbit/s, clock signals $HF_0$ to $HF_{I-1}$ and $HF_m$ are to be replaced by clock signals $HE_0$ to $HE_{I-1}$ and $HE_m$ at rate DE, the number of bits in FIG. 6 are to be multiplied by the ratio of rates DE/DF=12, and the word MSTF is to be replaced by the word MSTE.

The various functional means included in central station 1 to carry out the synchronization method are now described, after having recalled the general structure of the central station.

Referring to FIG. 8 and as described in U.S. patent application Ser. No. 07/786,763, central station 1 essentially comprises multiplexing and transmitting means, receiving and demultiplexing means, a time base BT and a communication management unit UG.

In the multiplexing and transmitting means, a multi-rate multiplexing device DM time multiplexes N=8 digital channels in communication which are selected in groups of parallel incoming channels associated to the various rates. According to the illustrated embodiment, two groups of incoming channels CEF1 to CFN and CEE1 to CEEN are scheduled respectively at rates dF=160 kbit/s and dE=2,048 Mbit/s. The multiplexing device DM increases the rates of the channels selected to rates DF and DE so as to form the N=8 sectors S1 to SN of a forward frame TCT. Then sectors S1 to SN are encrypted in an encrypting circuit 10 depending on the respective data sectors S1 to SN in the received backward frame TCT which is regenerated by the same local clock signal $H_{DE}$, as will be seen later. The frame sectors thus encrypted are analyzed in a transmission quality checking circuit 11 to introduce a parity bit for each of the sectors at the end of the sector, then run through a management sector bit inserting circuit 12 where management sector SG is introduced as heading of frame TCT under the control of management unit UG. Finally, frame TCT thus constituted is transmitted in the tree-structure transmission medium SUT at the start of first half-duplex half-period PT/2 by a transmitting circuit 13, for example with LED or laser diode.

The receiving and multiplexing means in central station 1 comprise, as from the transmission medium SUT, a receiving circuit 14, for example including a PIN-diode photodetector, which is connected to medium SUT and to circuit 13 by a local optical coupler 134, a bit regenerating and rhythm recovering circuit 15 for conventionally regenerating the bits as a function of the on-line rates in the sectors, a circuit 16 where the various fields which compose management sector SG in a received backward frame TTC are extracted, and which are chiefly processed by management unit UG, and a circuit 17 which checks in particular the parity of each of the sectors S1 to SN in frame TTC in relation to parity bits at the end of the sectors and which indicates any anomaly resulting from this checking to management unit UG. Data sectors S1 to SN of a frame TTC are applied in series to a multirate demultiplexing device DD which demultiplexes the sectors after having regrouped them into a multiplex signal at the frequency of $(1.024 \times 8)/500 = NS \times dE = 16.384$ MHz during a frame period PT = 500 μs, considering each of the N=8 sectors as composed of a group of 1.024 useful bits, whatever the on-line rate of the sector, which then routes them to at most N outgoing channels in communication addressed amongst a group of N outgoing channels CSF1 to CSFN at rate dF = 160 kbit/s and a group of N outgoing channels CSE1 to CSEN at rate dE = 2.048 Mbit/s.

Time base BT acts as master clock for the slave time bases in terminal stations $2_1$ to $2_K$. Time base BT provides, as from the frequency of 49.152 MHz corresponding to the high on-line rate, all the clock signals necessary for the multiplexing/demultiplexing, frame transmitting/receiving and terminal station synchronization operations.

Management unit UG manages the communications and, in particular, in association with synchronization circuits 4F and 4E specific to the invention, the synchronization of the transmitting means of transmitter in the terminal stations as a function of their distances to the central station so as to avoid any overlapping of the sectors in the frame received by the central station, and the remote controlled setting of the power of said transmitting means whereby the receiving means in the central station receive digital signals of the same level of amplitude, whatever the distances from the terminal stations to the central stations. This management is provided notably by means of the bits of management sector SG of the frames along both directions of transmission. From the point of view of communications, management unit UG derives the number of terminal stations in service, attributes a data sector to each terminal station wishing to communicate, and associates each sector to incoming and outgoing channels for a communication relating to a terminal station and hence to the on-line rate of the station.

As embodied by the invention, central station 1 moreover comprises as many terminal station synchronization circuits 4F, 4E as there are different on-line rates DF, DE, which are distinguished by management unit UG, and a backward frame data sector regenerating circuit 5 which globally regenerates each received backward frame TTC by consecutively positioning the sectors to each other and which is interconnected between the data output from the management sector extracting circuit 16 and the data input from the transmission quality checking circuit 17. Circuits 4F, 4E and 5 are described below.

Circuits 4F and 4E being functionally identical, only the operating of synchronization circuit 4F for low rate terminal station DF is described in detail.

Referring to FIG. 9F, synchronization circuit 4F basically comprises a clock scanning circuit 41F, a synchronization word comparing circuit 42F, a central clock selecting circuit 43F, and a delay evaluating circuit 44F.

In the clock scanning circuit 41F, a set of frequency dividers 410F derives the I=8 clock signals $HF_O$ to $HF_{I-1}$ having rate DF and phase shifted by TBF/I as a function of a clock signal at frequency $I \times DF = 32.768$ MHz produced by time base BT. The frequency dividers 410F apply clock signals $HF_O$ to $HF_{I-1}$ to the I inputs of a multiplexer 411F which are selected by numbers 0 to I-1 produced by a counter modulo-I 412F through a three-wire selection bus. In accordance with sub-steps SE=1 to SE=I (FIG. 5), a clock input of counter 412F receives a frame clock signal HT at half-duplex frame frequency during I=8 consecutive frame periods. Clock signals $HF_O$ to $HF_{I-1}$ are thus applied respectively for I=8 slots of signal HT to a clock input of a shift register 420F included in comparing circuit 42F, via a direct input of a two-input AND gate 413F.

A data input of register 420F receives synchronization words MSTF via a two-input AND gate 45 and a two-output demultiplexer 46 which are common to circuits 4F and 4E (FIG. 8). The first input of the gate 45 is connected to the management sector output from extracting circuit 16, connected to unit UG, whereas a second input of gate 45 receives signal HT derived by the management unit. Each of the slots of signal HT start at the same time as the transmission of a forward frame TCT by the central station, or according to another embodiment, at the latest at the transmission end of a forward frame, and ends at least after the normal receiving period of a synchronization word field MSTF, MSTE when management sector SG is consecutive to the backward frame TTC. Nevertheless to take account of the thermal drift causing slow phase-shifts, as will be seen later, the slots of signal HT include substantially the period DG of management sector SG. Consequently a slot of signal HT has a length less than $DT + 2TP + DG = 195.31 + 109.375 + 7.81 \mu s = 312.5 \mu s$.

Time interval 2TP+DG during which a time synchronization word transmitted by one of the terminal stations is likely to be received by the central station, is always thus contained in a slot of signal HT which opens the AND gate 45. The first and second outputs of demultiplexer 46 direct words MSTF and MSTE on output from gate 45 respectively toward shift registers 420F and 420E in circuits 4F and 4E as a function of a rate selection signal DF/DE produced by management unit UG and hence as a function of the rate of the terminal station in process of synchronization.

In comparing circuit 42F, LF=8 parallel outputs from register 420F and LF=8 parallel outputs from a read-only-memory 421F are connected respectively to the two input buses of a REG1, REG0 threshold and bit-by-bit comparator 422F. Memory 421F contains a word MSTF and is preferably a PROM-type or wired-type with straps. At each of the periods of clock signals $HF_O$ to $HF_{I-1}$ respectively during I slots of signal HT, comparator 422F compares the prestored word in memory 421F with the content of register 420F so as to detect a word MSTF received.

In response to an equality of compared synchronization words, the output of comparator 422F orders writing of the index number i of corresponding clock signal $HF_i$ which is delivered by counter 412F, in one of the I storage registers 430F associated with a m-computation PROM circuit 431F included in the central clock selecting circuit 43F. Assuming that all the bit-by-bit comparisons comply with the example illustrated in FIG. 7, registers 430F have stored the numbers 3, 4, 5, 6, 7, 0 and 1 of the clock signals having implicated an equality of synchronization words, at the end of sub-step SE8. Management unit UG halts the transmission of signal HT and initiates the second step $E=1$ by applying a computation command signal S/E1 at state "1" to registers 430F and to computation circuit 431F. Said stored numbers of clock signals are transferred into circuit 431F which computes the index m of central clock signal $HF_m$, equal to $HF_6$ according to FIG. 7. The index m is applied by a three-wire output bus from circuit 431F to the selection inputs in a multiplexer 432F which receives the $I=8$ clock signals $HF_O$ to $HF_{I-1}$ outgoing from the frequency dividers 410F. The output of multiplexer 432F supplies the central clock signal $HF_m$ to the clock input of shift register 420F and to a clock input of a counter 440F which is included in circuit 44F.

The delay evaluating circuit 44F comprises, further counter 440F, a computation PROM circuit 441F, a buffer register 442F and a two-input AND gate 443F.

Signal S/E1 initiating the second step $E=1$ is also applied to an inverting input of AND gate 413F so as to inhibit any clock signal supplied by multiplexer 411F on input of register 420F, and applied to a first input of gate 443F. The output of gate 443F is linked to a reset input RAZ of counter 440F and a control input C of circuit 441F. At the start of transmitting a forward frame TCT in a forthcoming frame period PT, management unit UG applies a slot of signal HT to gates 45 and 443F. After resetting, counter 440F counts the pulses of clock signal $HF_m$, and comparator 422F detects the synchronization word MSTF during the slot of signal HT. As soon as this detection occurs, comparator 442F halts the pulse counting in the counter 440F, the output of the comparator being connected to an inhibiting input B of the counter. The pulse count in counter 440F is then equal to $CF_k = DTF + 2 tF_k + LF$ according to FIG. 6. Computation circuit 441F initially containing the maximum count $CF_{MAX}$ in programmable read-only-memory, computes the delay $RF_k = CF_{MAX} - CF_k$ after having read count $CF_k$ in counter 440F in response to the end of the slot of signal HT signalled on input C during step $E=1$. Preferably, as already stated, step $E=1$ is reiterated so as to compute count $CF_k$ and delay $RF_k$ a second time; in this case computation circuit 441 compares the two computed delays and if they are identical, orders the final synchronization phase.

The result of computation $RF_k$ is then transferred from circuit 441F to management unit UG via buffer register 442F series-converting word $RF_k$. Management unit UG then inserts token $J_k$, word $RF_k$ in field IC, and a delay programming order in field OC, in the next two successive forward frames TCT, via the management sector inserting circuit 12. In terminal station $2_k$ in process of synchronization, a management sector extracting circuit supplies word $RF_k$ to a management unit which, in response to the second delay programming order received, consequently programs a digital delay line included on transmission output from the terminal station, typically between a management sector inserting circuit and a transmitting circuit illustrated in U.S. patent application Ser. No. 07/786,763.

It should be noted that in accordance with the algorithm in FIG. 5, an error signal ER is delivered by the m-computation circuit 431F to management unit UG, either at the end of sub-step $SE=I$ when index m cannot be determined, or at the end of a step $E=1$ when the synchronization word MSTF expected in the slot of signal HT has not been detected. In the first case, the m-index determination fault can be signalled for example when more than three word equalities are detected; this indicates an operating fault notably in the clock recovering circuit or in the management unit of the terminal station. In the second case, the fault in the detection of word MSTF can be due to a wrong translation of the delay programming order, or to an operating fault on the delay line in the terminal station; management unit UG then decides, in another embodiment, to reiterate step $E=1$ once or twice: $SE=I+2$ or $SE=I+3$ (FIG. 5). In all cases when the error persists, it is indicated to the operator in central station 1 so as to carry out a maintenance operation in the terminal station, and management unit UG then switches to the following task, for example, if required, to perform the synchronization of another terminal station.

As already stated, all the synchronization circuits 4F and 4E are functionally identical, and only differ from each other through the functional means dependent on the on-line rates DF and DE associated to the terminal stations, i.e., dependent on the clock signals and, according to other embodiments, on the numbers of bits in the time synchronization words.

Figure 9E:
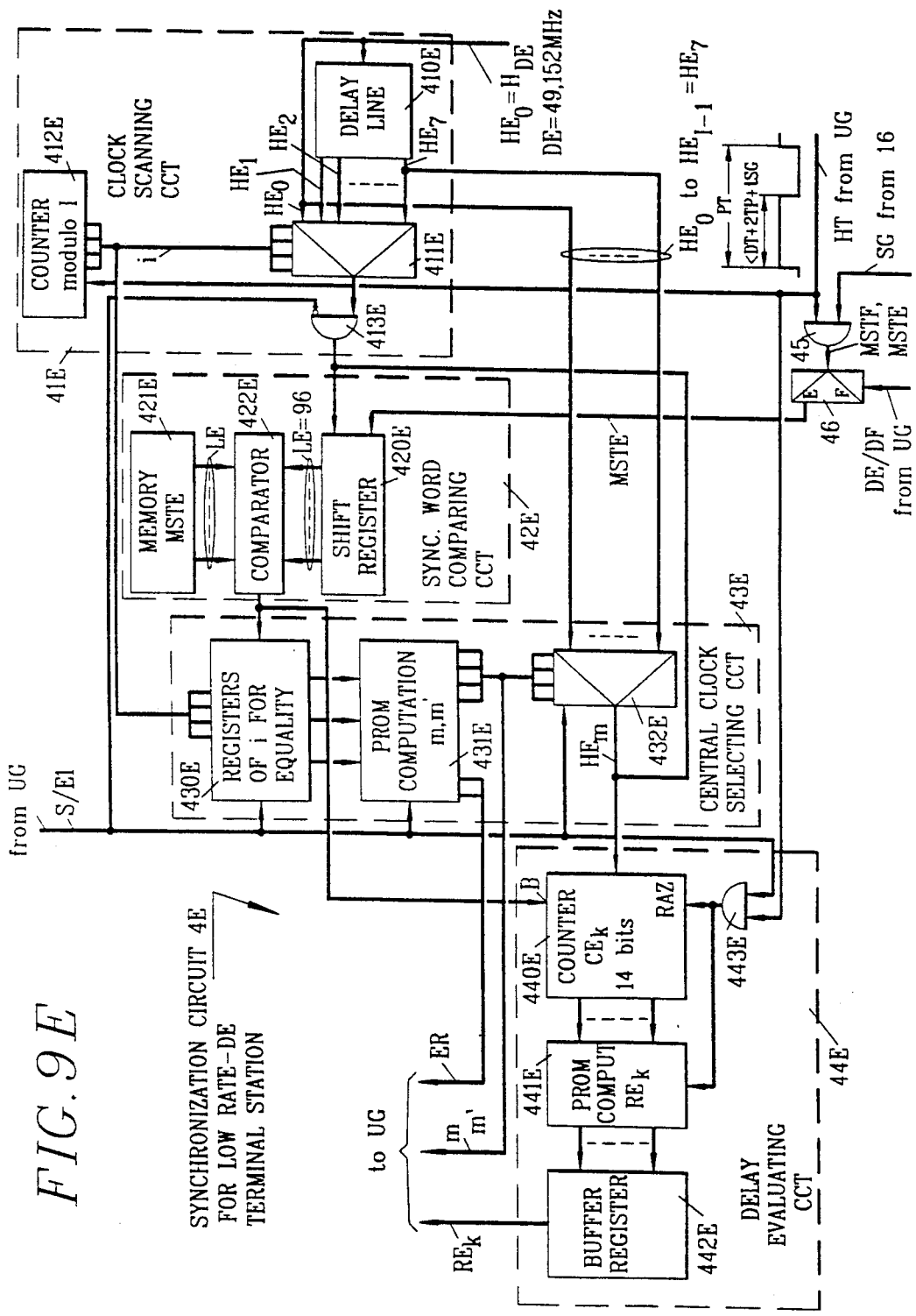

In synchronization circuit 4E for high rate DE and, e.g., for 96-bit synchronization word MSTF, shown in FIG. 9E, circuits 41E, 42E, 43E and 44E are to be found again, including components equivalent to those included in circuits 41F, 42F, 43F and 44F and designated by respective numeral references coupled to the letter E instead of the letter F.

When the rate is high, such as rate $DE=49.152$ Mbit/s, the technology of conventional digital circuits is unable to produce a clock signal with a very high frequency of $49.152 \times 8 = 393.2$ MHz. The frequency dividers 410F are replaced by a delay line 410E in the clock scanning circuit 41E. Delay line 410E derives, as from a reference clock signal $H_{DE}$ at 49.152 MHz produced by time base BT, I clock signals $HE_O = H_{DE}$ to $HE_{I-1} = HE_7$ at 49.152 MHz with successive phase-shifts of TBE/I, where $TBE = 1/49.152$ μs. Clock signals $HE_O$ to $HE_{I-1}$ are equivalent to signals $HF_O$ to $HF_{I-1}$ and are used not only for the synchronization procedure SY relating to a terminal station at rate DE when being set into service, but also during a cyclic check and synchronization monitor procedure, as will be seen later.

In comparing circuit 42E, the number of stages of the shift register 420E, of memory 421E and of comparator 422E is equal to the length $LE = LF (DE/DF) = 96$ bits of synchronization words MSTE according to the previous example. Like the capacity of counter 412E and registers 430E storing the numbers i implicating equalities of words is equal to $I + 4 = 12$.

The capacity of counter 440F in circuit 44F equal to $11 = Log_2 2,048 > Log_2 (800 + 448 + 8)$ bits is replaced by that of $14 = Log_2 16,384 > Log_2 12 (800 + 448 + 8)$ bits of counter 440E in circuit 4E.

The synchronization of the terminal station as described above referring to FIGS. 5 and 9F, 9E occurs especially when connecting a terminal station to the transmission network SUT and installing it, when setting up a communication and when losing information in frames either in central station 1 or in the one of the terminal stations $2_1$ to $2_K$.

When operating normally management unit UG in central station 1 can receive at least an error signal ER after one of the cyclic checks VE on the synchronization of the terminal stations. Such an error signal is notably due to slow thermal drifts on the transmission medium SUT, such as optical fiber, modifying the propagation times $t_1$ to $t_K$ by a few nanoseconds.

This drift phenomenon is negligible with low rates DF given that the synchronization is produced at $1/I = \frac{1}{8}$ of the bit time TBF higher by several tens of nanoseconds. A data sector at one of the low rates of a few Mbit/s is then simply and directly regenerated firstly at the corresponding frequency of the central respective clock signal $HF_m$, established when synchronizing.

Conversely the thermal drift phenomena can no longer be disregarded when regenerating a data sector with a high rate, such as rate DE=49.152 Mbit/s. In this case synchronization is obtained to the nearest few nanoseconds, typically to the nearest TBE/I=2.5 ns. It would be possible to decrement or increment by one or several time bit fractions TBE/I, the delay $RE_k$ in the corresponding terminal station; this would involve a complex command and signal exchange protocol with interruption to the communication in method.

The backward frame regenerating circuit 5 in conjunction with circuit 4E as embodied by the invention solves this problem whilst applying a remedy to the previous drawback.

The principle of regenerating a bit lasting TBE in a data sector at high rate DE received in the central station is explained briefly referring to the first lines of the chronograms in FIGS. 10 to 12. It is assumed that during a synchronization check VE', $HE_m$ denotes the central clock signal selected during a previous check VE, and $HE_{m'}$ denotes the central clock signal selected after the check in method VE'.

The checking procedure VE' is similar to the initial synchronization procedure SY without the delay computation step, and is performed in relation to a word MSTE in a management sector consecutive to frame TTC. Knowing that the frequency of the synchronization checks is high in relation to the thermal drifts scheduled, a central clock signal shift cannot, in practice, be greater than one quarter of the bit time, i.e., greater than 2 TBE/I, which is expressed by $|m'-m| \leq 2$. Such a shift results from the variation in propagation time $t_k$, for example, caused by the heating of the optical fiber and hence by an elongation of the optical fiber, between two synchronization checking procedures on a terminal station $2_k$. Circuit 431E indicates to the management unit UG, the new index m' whose difference m' - m with the previous index m can vary from −2 to +2 and is representative of the thermal drift of the propagation time. In these conditions it is necessary to consider fictitiously I+4 clock signals HE_$2 = HE_6$, HE_$_1 = HE_7$, $HE_0$ to $HE_7$, $HE_8 = HE_O$ and $HE_9 = HE_1$ so that each index can be replaced by a new index m' so that $|m' - m| \leq 2$ after the second computation made during the check VE' confirming the value of m'. The value of m' can be equal to the −2, −1, 0 to 7, 8 and 9 on output from circuit 431E linked to the management unit. The backward frame regenerating circuit 5 then singles out the three sets of clock signals $HE_{-2}$ to $HE_1$, $HE_2$ to $HE_5$ and $HE_6$ to $HE_9$ so as to synchronize all the frame sectors at high rate in relation to the same clock signal, typically $HE_5$ as will be seen later, whatever the m' - m difference in index.

FIGS. 10, 11 and 12 illustrate respectively examples of regeneration of a bit at high rate for the three sets of clock signals.

In the first line of FIG. 10 is shown a bit of width TBE which is received during procedure VE' and which corresponds to a central clock signal $HE_{m'} = HE_O$, as shown in the second line of FIG. 10. This example is associated with the following special cases. Before the influence of a thermal drift, the central clock signal $HE_m$ whose index m was computed during procedure VE can be, in particular, one of the signals $HE_O$ or $HE_1$, whereas signal $HE_{m'}$ is $HE_6$, $HE_7$, or else $HE_0$, $HE_1$. An intermediate read of the received bit with clock signal $H_5$ between the read with signal $HE_{m'}$ and that with the regeneration clock signal $HE_5$, enables synchronizing of all bits read with a signal $HE_{m'}$ belonging to the first set.

In the first line of FIG. 11 is illustrated a bit of width TBE received during procedure VE' which has selected a clock signal $HE_{m'} = HE_3$ as shown in the second line of FIG. 11. In this case the index m of the clock signal $HE_m$ computed during the previous procedure VE was equal to 1, 2, 3, 4 or 5. An intermediate read of the received bit with signal $HE_1$ preceding that with signal $HE_5$, as shown in the last two lines of FIG. 11, enables synchronizing any bit read with a signal $HE_{m'}$ belonging to the second set.

In the first line of FIG. 12 is illustrated a received bit of width TBE received corresponding to a clock signal $HE_{m'} = HE_7$ selected during procedure VE' and shown in the second line of FIG. 12. The index m of clock signal $HE_m$ computed during the previous procedure VE was then equal to 5, 6 or 7. This example is associated with the special case where the index m computed during a check VE would be equal to 6 or 7, and the index m' is equal to 8 or 9, or else 6 or 7, during a following check VE'. A direct read by clock signal $HE_5$ of the bit regenerated by the signal $HE_m$ is possible for any signal $HE_m$ belonging to the third set as shown in the last line of FIG. 12.

The bits read and shown in the third lines of FIGS. 10 and 12 are thus synchronizable with the same clock signal $HE_5$ as shown in the last lines of these Figures. In the absence of a regenerating circuit 5 embodying by the invention, the received bits would be regenerated only by signals shown in the second lines of FIGS. 10 to 12, and subsequently the sector should be transmitted with a time shift non-synchronized with clock $H_{DE}$ used in the demultiplexing device DD.

According to whether clock signal $HE_{m'}$ belongs to one of the three sets defined above, the regeneration of the bit received results from appropriate methoding in regeneration circuit 5 so that all the bits received are phased in with the same clock signal $H_{DE}$, whatever the thermal drift and the signal $HE_{m'}$, the latter being designated subsequently by $HE_m$ given that m' replaces m during a checking procedure.

Figure 13:
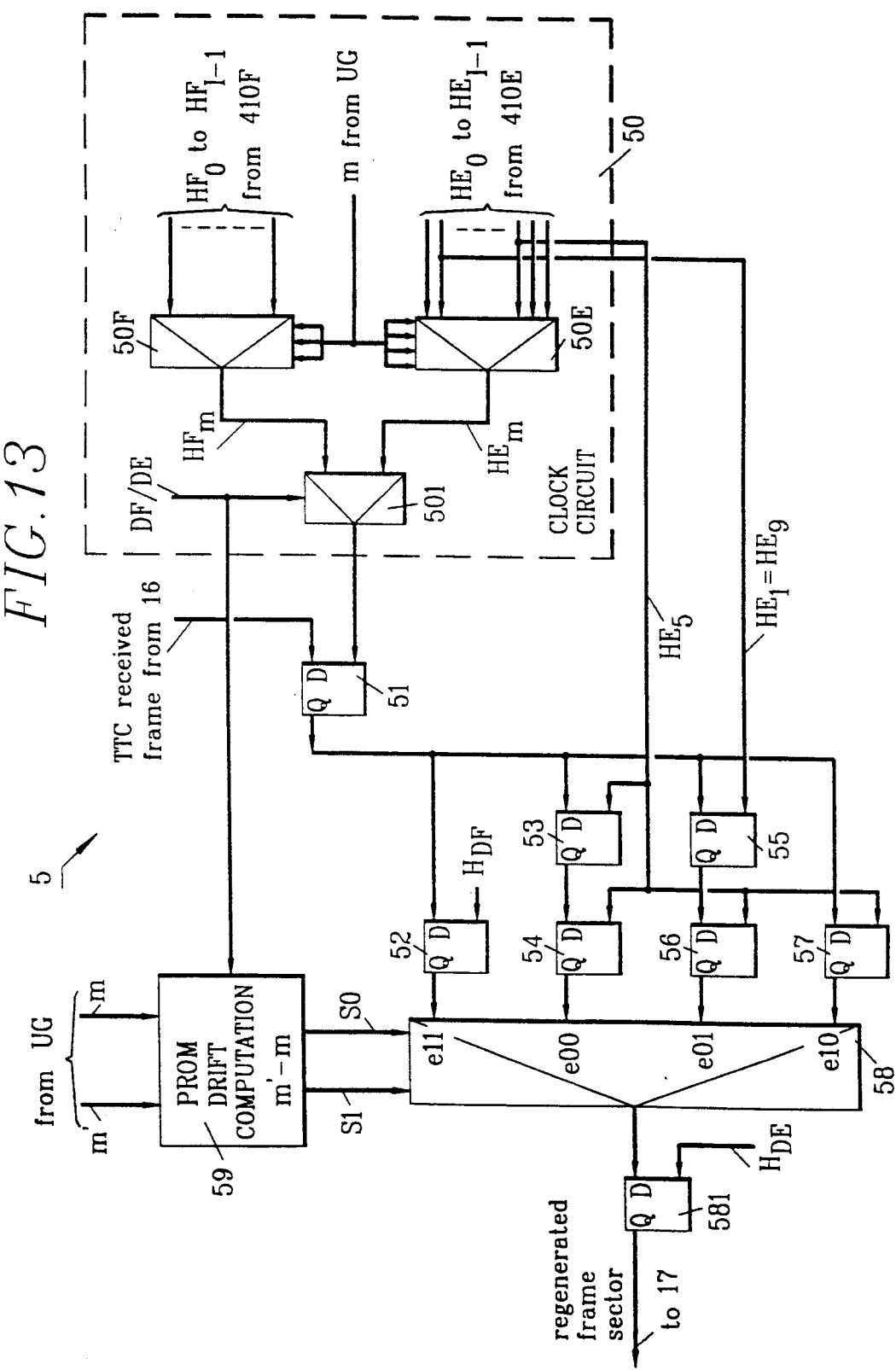
FIG. 13 is a detailed block diagram of a backward frame regenerating circuit included in the central station.

Referring to FIG. 13, the backward frame regenerating circuit 5 comprises a clock circuit 50, seven D-type flip-flops 51 to 57, a multiplexer 58 having four inputs e00, e01, e10, e11, and a drift computation PROM circuit 59.

Clock circuit 50 supplies signal $HF_m$, $HE_m$ depending on rate DF, DE of each received sector in frame TTC together with the clock signal $HE_5$ and $HE_1 = HE_9$ necessary to method bits at high rate. The two groups of clock signals $HF_0$ to $HF_{I-1}$ and $HE_O$ to $HE_{I-1}$ are supplied by the frequency dividers 410F and the delay line 410E and are applied respectively to the inputs of two multiplexers 50F and 50E. The number m of signal $HE_m$, or m of signal $HE_m$ after an initial synchronization, or m of signal $HE_m$ after each cyclic check, is indicated by the management unit UG and selects in the multiplexers 50F and 50E, signals $HF_m$ and $HE_m$ which are applied to the two inputs of a multiplexer 501. It should be noted that at this level the number m lies between O and I-1=7, i.e., in particular when m' is equal to $-2$, $-1$, 8 or 9, the corresponding value of m applied to multiplexers 50F and 50E is equal to 6, 7, 0 or 1.

Signal DF/DE selects one of the two clock signals $HF_m$ and $HE_m$ as a function of the rate of the sector in question so that the output of multiplexer 501 applies the clock signal selected to the clock input of the first flip-flop 51. The sector bits in backward frame TTC are received on input D of flip-flop 51 which regenerates the bits as a function of the respective selected clock signal.

The second flip-flop 52 is only used for the sectors at low rate DF. Input D and output Q of this flip-flop 52 are linked respectively to output Q of flip-flop 51 and to input e11 of multiplexer 58. The clock input of flip-flop 52 receives a local clock signal $H_{DF}$ of frequency 4.096 MHz supplied by the time base BT. When circuit 59 receives the signal DF/DE for low rate, its two-wire output bus S1, S0 is to "11" and selects input e11, circuit 59 making no computation and acting as a decoder.

The other flip-flops 53 to 57 are used to regenerate sectors at high rate DE. They are distributed into three groups depending respectively on the three sets of clock signals defined above, i.e., the thermal drift represented by the couple of indices m' and m. This distribution is made by circuit 59 receiving the numbers m' and m respectively comprised between $-2$ and 9, and 0 and 7, supplied by management unit UG for each sector at rate DE. Clock signals $HE_5$ and $HE_1 = HE_9$ are supplied respectively by the sixth and second outputs of delay line 410E in the clock scanning circuit 50 (FIG. 9E). Signal HE1 is applied to the clock input of flip-flop 55. Signal $HE_5$ is applied to the clock inputs of flip-flops 53, 54, 56 and 57.

Flip-flops 53 and 54 are linked in series between output Q of flip-flop 51 and input e00 of multiplexer 58. They form a first flip-flop group which is selected by (S1,S0)="00" on output from circuit 59 when the signal $HE_m$ is equal to one of the signals $HE_6 = HE_{-2}$, $HE_7 = HE_{-1}$, $HE_0$ and $HE_1$, as shown in FIG. 10, i.e., when signal $HE_m$ belongs to the first set of clock signals. Referring to check VE', circuit 59 receives the two indices m and m' so as to distinguish the first from the third set of clock signals. In fact with m=0 or 1, circuit 59 produces (S1,S0)="00" when m'=$-2$ or $-1$, i.e., m'=6 or 7, and m'=0 or 1.

Flip-flops 55 and 56 are linked in series between output Q of flip-flop 51 and input e01 of multiplexer 58. They form a second flip-flop group which is selected by (S1,S0)="01" on output from circuit 59, in response to an index m' equal to 2, 3, 4 or 5, i.e., to a signal $HE_m$=-$HE_{m'}$ equal to $HE_2$, $HE_3$, $HE_4$ or $HE_5$ belonging to the second set of clock signals.

Flip-flop 57 has input D and output Q linked respectively to the output of flip-flop 51 and to the input e10 of multiplexer 58. It forms a second flip-flop group which is selected by (S1,S0)="10" on output from circuit 59 in response to a signal $HE_m$ equal to one of the signals $HE_6$, $HE_7$, $HE_0$, $HE_0 = HE_8$ and $HE_1 = HE_9$. In fact, with m=6 or 7 for a check VE, circuit 59 produces (S1,S0)="10" when during a subsequent check m'=8 or 9, i.e., m'=0 or 1 and m'=6 or 7.

Whatever the drift, all the bits at high rate are synchronous with the same clock signal HE5 applied to flip-flops 54, 56 and 57, and are thus affected by various thermal drifts and through the flip-flops the same delay in relation to signal $HE_m$.

The output of multiplexer 58 is linked to a data input D of a flip-flop 581 whose clock input receives the local clock signal $H_{DE} = HE_O$ supplied by the time base. The sectors at different rates DF and DE are thus synchronized by the same clock into a regenerated backward frame applied to demultiplexing circuit DD via quality checking circuit 17.

Thus, globally, the regenerating circuit 5 receives a multi-clock and multi-phase frame and regenerates a single clock frame.

It should be noted that the computation of delay $RE_k$ in PROM circuit 441E (FIG. 9E) and new delay programming in the corresponding terminal station $2_k$ can be accomplished so as to fully synchronize the terminal station again when the difference (m'$-$m) is greater than two when checking the synchronization.

Although the invention has been described referring to a half-duplex communication network with single transmission medium, the synchronization method is also applicable when transmission between the central station and terminal stations is simultaneously bidirectional (duplex mode), for example through coaxial cables and modems. In this case, the duration of a frame DT is practically equal to the duration of a frame period PT.

What we claim is:

1. A method for synchronizing terminal stations located at different distances from a central station and linked through a tree-structured transmission medium so that data sectors emitted by said terminal stations at different times do not overlap and are multiplexed in a backward frame on receiving in said central station, said method previously comprising in said central station, determining a central clock signal as a function of synchronization words successively transmitted by one of said terminal stations to be synchronized and detected by said central station, said terminal station being associated with a predetermined rate, and said central clock signal being determined to the nearest fraction TB/I where TB is the bit time of bits of said synchronization words transmitted at said predetermined rate and where I denotes an integer, said determination of said central clock signal comprising I sub-steps, a sub-step of index i varying from 0 to I-1 comprising:

emitting from said central station a forward frame including a synchronization word emission order intended for said terminal station, transmitting said synchronization word from said terminal station in response to the reception end of said forward frame, detecting said transmitted synchronization word in said central station by means of a clock signal having a phase-shift i.TB/I in relation to a reference clock signal and having said rate of said terminal station, and p1 comparing said detected synchronization word with a synchronization word stored in said central station, and storing said index i in response to an equality of the compared words, thereby forming a stored index, and said method comprising subsequently to said I sub-steps, computing a computed index m between 0 and I-1 as a function of substantially the center of said stored indices of the clock signals having caused equalities of words, thereby determining said central clock signal, emitting from said central station at least one last forward frame including said synchronization word emission order intended for said terminal station to be synchronized, triggering a counting of pulses of said central clock signal in said central station responsive to emitting said last forward frame, transmitting a last synchronization word from said terminal station to the central station in response to the reception end of said forward frame, halting said pulse counting in response to the detection of said last synchronization word in said central station as a function of said central clock signal so as to derive a pulse count, computing a delay as a function of said pulse count, and transmitting said delay from said central station to said terminal station so that said terminal station emits a data sector in an assigned time interval of subsequent backward frames.

2. The method according to claim 1, wherein any data sector emitted by said terminal station is received in said central station in relation to said respective central clock signal and is regenerated in relation to a predetermined reference clock signal which is used to regenerate all said data sectors in the backward frames emitted by said terminal station.

3. A method according to claim 1 comprising a cyclic check on the synchronization of said terminal station, a check consisting in determining a second central clock signal, evaluating a shift between a first central clock signal determined during a previous check and said second central clock signal, in receiving in said central station any data sector transmitted by said terminal station in relation to said second central clock signal, and in regenerating the bits of said received data sector as a function of said evaluated shift and in relation to a predetermined reference clock signal which is used to regenerate all said data sectors in a backward frame transmitted by said terminal stations.

4. The method according to claim 3, wherein when integer I is equal to 8, each central clock signal is selected amongst twelve reference clock signals phase-shifted successively by TB/8 and associated to said respective indices −2, −1, 0 to 7, 8 and 9, and bits of a data sector received by said central station in relation to said central clock signal having said computed index, are regenerated according to one of the following cases:

a) when said computed index lies between −2 and 1, said received bits are read successively by said central clock signal of said computed index, then twice by the clock signal of index 5, said computed index equal to −2 or −1 being replaced by 6 and 7, respectively.

b) when said computed index lies between 2 and 5, said received bits are successively read by said central clock signal of said computed index and by the clock signals of indices 9 and 5, the clock signal of index 9 being identical to clock signal of index 1; and c) when said computed index lies between 6 and 9, said bits received are successively read by said clock signal of said computed index and by the clock signal of index 5, said computed index being equal to 8 or 9 being replaced by index 0 or 1 respectively.

5. The method according to claim 1, wherein said terminal stations receive and transmit respective data sectors which are multiplexed in multirate frames and which have different on-line rates, said synchronization words occupying a predetermined time but being at the respective on-line rates associated with said terminal stations, and said clock signals used to synchronize said terminal stations being at the respective on-line rates of the terminal stations.

6. A device for synchronizing one of terminal stations located at different distances from a central station and linked through a tree-structured transmission medium so that data sectors emitted by said terminal stations at different times do not overlap and are multiplexed in a backward frame on receiving in said central station, said terminal station being associated with a predetermined rate to which data sectors bits are transmitted from said terminal station to said central station, said device being included in said central station and comprising:

means for producing at least I clock signals at said predetermined rate of said terminal station and phase-shifted by TB/I respectively during I successive frame periods where TB is the bit time of bits emitted at said predetermined rate from said terminal station and I is an integer, means for detecting synchronization words transmitted by said terminal station in relation to said I clock signals during said I frame periods thereby deriving I detected synchronization words, respectively, means for comparing said I detected synchronization words with a reference synchronization word stored in said central station, means for storing the indices of the clock signals having caused an equality between said respective detected synchronization word and said reference synchronization word in said comparing means, means for computing an index as a function substantially of the center of the indices of said clock signals having caused equalities of compared words thereby producing a central clock signal corresponding to said computed index and designed to regenerate bits transmitted by said terminal station after the synchronization thereof, means for counting pulses of said central clock signal between emission of a forward frame by said central station and detection of a synchronization word in relation to said central clock signal during a frame period succeeding said I frame periods thereby deriving a pulse count, and means for computing said delay as a function of said pulse count whereby said central station transmits said delay to said terminal station, and said terminal station transmits a data sector in an assigned time interval of subsequent backward frames.

7. A device according to claim 6, comprising means for receiving all data sector bits transmitted by said terminal station at said predetermined rate of said central clock signal and means for regenerating each bit received by said central station in relation to a same reference clock signal whatever said terminal station.

8. The device according to claim 7, wherein said regenerating means comprise means for cyclically compensating for a variation in the propagation time between each of said terminal stations and said central station expressed by a shift in said bits received in said central station in relation to said central clock signal.

* * * * *

UNITED STATES PATENT AND TRADEMARK OFFICE
CERTIFICATE OF CORRECTION

PATENT NO. : 5,272,694

DATED : December 21, 1993

INVENTOR(S) : Fabrice Bourgart et al

It is certified that error appears in the above-identified patent and that said Letters Patent is hereby corrected as shown below:

On title page, add item

-- [30] Foreign Application Priority Data

March 21, 1991    France     91-03457 --

Signed and Sealed this

Third Day of May, 1994

Attest:

BRUCE LEHMAN

*Attesting Officer*    *Commissioner of Patents and Trademarks*